US012052541B2

(12) United States Patent
Cho et al.

(10) Patent No.: US 12,052,541 B2
(45) Date of Patent: *Jul. 30, 2024

(54) ELECTRONIC DEVICE INCLUDING AIR ADSORPTION MEMBER AND SPEAKER MODULE

(71) Applicant: SAMSUNG ELECTRONICS CO., LTD., Suwon-si (KR)

(72) Inventors: Joonrae Cho, Suwon-si (KR); Changshik Yoon, Suwon-si (KR); Kiwon Kim, Suwon-si (KR); Myeungseon Kim, Suwon-si (KR); Taeeon Kim, Suwon-si (KR); Myungcheol Lee, Suwon-si (KR); Byounghee Lee, Suwon-si (KR); Seongkwan Yang, Suwon-si (KR); Woojin Cho, Suwon-si (KR); Hochul Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/129,985

(22) Filed: Apr. 3, 2023

(65) Prior Publication Data

US 2023/0239614 A1 Jul. 27, 2023

Related U.S. Application Data

(63) Continuation of application No. 16/909,393, filed on Jun. 23, 2020, now Pat. No. 11,622,190.

(30) Foreign Application Priority Data

Aug. 2, 2019 (KR) .......................... 10-2019-0094579

(51) Int. Cl.
*H04R 1/28* (2006.01)
*H04M 1/03* (2006.01)
*H04R 1/02* (2006.01)

(52) U.S. Cl.
CPC ............ *H04R 1/288* (2013.01); *H04M 1/035* (2013.01); *H04R 1/025* (2013.01); *H04R 1/2811* (2013.01);
(Continued)

(58) Field of Classification Search
CPC .... H04R 1/025; H04R 1/2811; H04R 1/2834; H04R 1/288; H04R 2201/029; H04R 2400/11; H04R 2499/11; H04M 1/035
See application file for complete search history.

(56) References Cited

U.S. PATENT DOCUMENTS 9,838,765 B1\* 12/2017 Li ......................... H04R 1/023
10,057,678 B2  8/2018 Kwon et al.
(Continued)

FOREIGN PATENT DOCUMENTS

CN  105916081 A  8/2016
CN  106792389 A  5/2017
(Continued)

OTHER PUBLICATIONS

U.S. Appl. No. 16/909,393, filed Jun. 23, 2020; Cho et al.
(Continued)

*Primary Examiner* — Huyen D Le
(74) *Attorney, Agent, or Firm* — NIXON & VANDERHYE P.C.

(57) ABSTRACT

In various embodiments, an electronic device includes: a diaphragm, a speaker module including a speaker configured to output a sound through a vibration of the diaphragm, and a housing accommodating the diaphragm and the speaker module therein and including a first space provided in a first
(Continued)

direction from the speaker module and a second space provided in a second direction opposite the first direction. The electronic device further includes an air adsorption member comprising an air adsorbing material disposed in the first space and having a volume ratio of 90% or less of the first space, the air adsorption member configured to reduce air resistance to the diaphragm disposed above the speaker module without limiting the vibration of the diaphragm.

20 Claims, 18 Drawing Sheets

(52) U.S. Cl.
CPC ..... *H04R 1/2834* (2013.01); *H04R 2201/029* (2013.01); *H04R 2400/11* (2013.01); *H04R 2499/11* (2013.01)

(56) References Cited

U.S. PATENT DOCUMENTS

| | | | |
|---|---|---|---|
| 10,349,168 | B2 | 7/2019 | Liu et al. |
| 11,622,190 | B2 | 4/2023 | Cho et al. |
| 2007/0195982 | A1 | 8/2007 | Saiki et al. |
| 2009/0245562 | A1 | 10/2009 | Saiki et al. |
| 2010/0206658 | A1 | 8/2010 | Slotte |
| 2010/0329494 | A1 | 12/2010 | Rouvala et al. |
| 2014/0037119 | A1 | 2/2014 | Yuasa |
| 2015/0358721 | A1* | 12/2015 | Wang ................. H04R 1/2876 381/346 |
| 2016/0309254 | A1 | 10/2016 | Lembacher et al. |
| 2016/0345090 | A1 | 11/2016 | Wilk et al. |
| 2017/0064438 | A1 | 3/2017 | Wilk et al. |
| 2017/0188136 | A1 | 6/2017 | Kwon et al. |
| 2017/0195781 | A1 | 7/2017 | Kang et al. |
| 2017/0353785 | A1 | 12/2017 | Choi et al. |
| 2018/0132035 | A1 | 5/2018 | Cao |
| 2019/0058935 | A1 | 2/2019 | Lembacher et al. |
| 2019/0200109 | A1 | 6/2019 | Zhang et al. |
| 2019/0253789 | A1 | 8/2019 | Cao et al. |
| 2020/0211524 | A1 | 7/2020 | Feng et al. |
| 2021/0037321 | A1* | 2/2021 | Shuzhi ................. H04R 1/288 |

FOREIGN PATENT DOCUMENTS

| | | |
|---|---|---|
| CN | 106937219 A | 7/2017 |
| CN | 107592973 A | 1/2018 |
| CN | 109511062 A | 3/2019 |
| CN | 109688522 A | 4/2019 |
| JP | 2012-222673 A | 11/2012 |
| KR | 10-2017-0081136 | 7/2017 |
| KR | 10-2017-0081136 A | 7/2017 |
| KR | 10-1756673 B1 | 7/2017 |
| KR | 10-1788110 | 8/2018 |

OTHER PUBLICATIONS

European Extended Search Report dated Jul. 18, 2022 for EP Application No. 20850842.4.
International Search Report dated Oct. 8, 2020 in counterpart International Patent Application No. PCT/KR2020/007984.
Korean Office Action dated Aug. 28, 2023 for KR Application No. 10-2019-0094579.
Office Action for KR Application No. 10-2019-0094579 issued Feb. 26, 2024 and English translation, 12 pages.
Office Action for CN Application No. 202080054164.6 issued Mar. 25, 2024 and English translation, 23 pages.

* cited by examiner

ELECTRONIC DEVICE INCLUDING AIR ADSORPTION MEMBER AND SPEAKER MODULE

CROSS-REFERENCE TO RELATED APPLICATION

This application is a Continuation of U.S. application Ser. No. 16/909,393, filed Jun. 23, 2020 (U.S. Pat. No. 11,622,190) which claims priority on Korean Application No. 10-2019-0094579, filed on Aug. 2, 2019, the entire contents of which are all hereby incorporated herein by reference in their entireties.

BACKGROUND

Field

The disclosure relates to an electronic device including an air adsorption member capable of minimizing and/or reducing air resistance to vibration of a diaphragm disposed above a speaker module.

Description of Related Art

With a great variety of portable electronic devices such as smart phones popularized, various modules that perform particular functions are being provided in the electronic devices. For example, the electronic device may include at least one speaker module for outputting sounds. The speaker module may convert an electrical signal generated at the electronic device into an audible sound signal through the vibration of a diaphragm and output the sound signal.

As the thickness of the electronic device becomes thinner, the speaker module as well needs to be thinner. When the speaker module becomes thin, a vibration space of the diaphragm may be narrowed.

In the electronic device, sounds having opposite phases may be produced in a first direction (e.g., a rear surface) and a second direction (e.g., a front surface) of the diaphragm. Therefore, in order to prevent and/or reduce destructive interference due to the opposite phases of the first and second directions, the electronic device may be designed to separate a first space formed in the first direction and a second space formed in the second direction with respect to the diaphragm.

The diaphragm of the speaker module equipped in the electronic device may be limited in vibration due to the resistance of ambient air, so that the sound reproduction efficiency may be lowered. For example, when the vibration of the diaphragm is limited, the sound output through the speaker module may be reduced or the sound quality may be degraded.

SUMMARY

Embodiments of the disclosure may provide an electronic device including an air adsorption member disposed in a certain space (e.g., a rear space) of a housing in which a speaker module is mounted. The air adsorption member facilitates compression and relaxation of air, thereby minimizing and/or reducing air resistance to a diaphragm disposed above the speaker module without limiting the vibration of the diaphragm. In addition, this may secure a reliable amplitude of the diaphragm and thereby improve a sound quality of a low frequency band.

According to various example embodiments of the disclosure, an electronic device may include: a diaphragm; a speaker module comprising at least one speaker configured to output a sound through a vibration of the diaphragm; a housing accommodating the diaphragm and the speaker module therein and including a first space provided in a first direction from the speaker module, and a second space provided in a second direction opposite the first direction; and an air adsorption member comprising an air adsorption material disposed in the first space and having a volume ratio of 90% or less of the first space.

According to various example embodiments of the disclosure, an electronic device may include: a diaphragm; a speaker module comprising at least one speaker configured to output a sound through a vibration of the diaphragm; a housing accommodating the diaphragm and the speaker module therein, the housing including a first housing disposed at an upper position of the electronic device and a second housing disposed at a lower position of the electronic device, the housing including a first space provided in a first direction from the speaker module, and a second space provided in a second direction opposite the first direction; and an air adsorption member comprising an air adsorption material disposed in at least a part of the first and/or the second housing or disposed between the first and the second housing, and configured to adsorb air in the first space and/or the second space.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Various example embodiments of the disclosure will be described in greater detail below with reference to the accompanying drawings.

The following description with reference to the accompanying drawings is provided to aid in understanding of various embodiments of the disclosure. It includes various details to assist in that understanding but these are to be regarded as merely examples. Accordingly, those of ordinary skill in the art will recognize that various changes and modifications of the various example embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used to enable understanding of the disclosure. Accordingly, it should be apparent to those skilled in the art that the following description of various example embodiments of the disclosure is provided for illustration purpose only and not for the purpose of limiting the disclosure.

It is to be understood that the singular forms "a," "an," and "the" include plural referents unless the context clearly dictates otherwise. Thus, for example, reference to "a component surface" includes reference to one or more of such surfaces.

Figure 1:
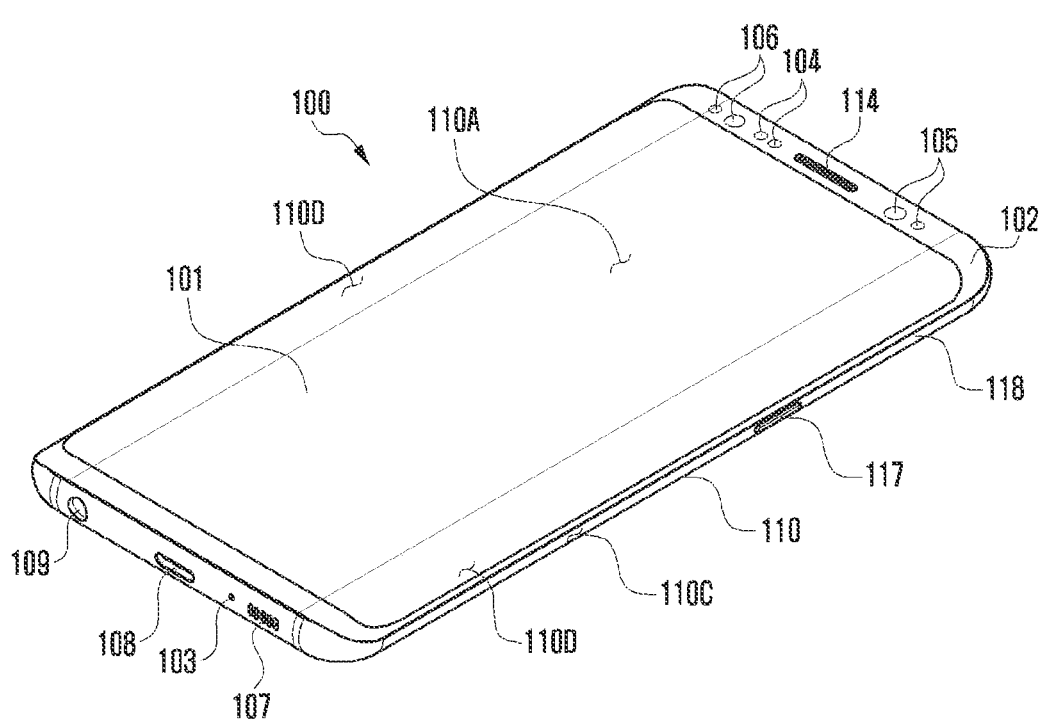
FIG. 1 is a perspective view illustrating a front surface of an example mobile electronic device according to an embodiment of the disclosure.

FIG. 1 is a perspective view illustrating a front surface of an example mobile electronic device according to an embodiment of the disclosure.

Figure 2:
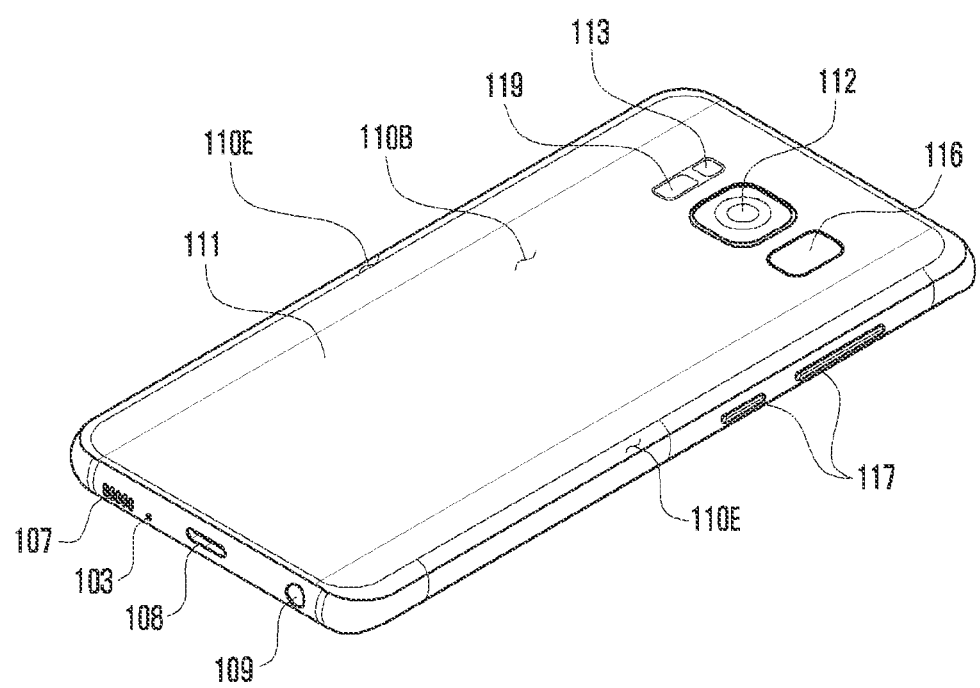
FIG. 2 is a perspective view illustrating a rear surface of the mobile electronic device shown in FIG. 1 according to an embodiment of the disclosure.

FIG. 2 is a perspective view illustrating a rear surface of the electronic device of FIG. 1 according to an embodiment of the disclosure.

Referring to FIG. 1 and FIG. 2, an electronic device 100 according to an embodiment may include a housing 110 including a first surface (or front surface) 110A, a second surface (or rear surface) 110B, and a side surface 110C surrounding the space between the first surface 110A and the second surface 110B. In another embodiment (not illustrated), the housing may denote a structure that forms a part of the first surface 110A, the second surface 110B, and the side surface 110C illustrated in FIG. 1. According to an embodiment, the first surface 110A may be formed by a front plate 102, at least a part of which is substantially transparent (for example, a glass plate including various coating layers, or a polymer plate). The second surface 110B may be formed by a rear plate 111 that is substantially opaque. The rear plate 111 may be made of coated or colored glass, ceramic, polymer, metal (for example, aluminum, stainless steel (STS), or magnesium), or a combination of at least two of the above-mentioned materials. The side surface 110C may be formed by a side bezel structure (or "side member") 118 which is coupled to the front plate 102 and to the rear plate 111, and which includes metal and/or polymer. In some embodiments, the rear plate 111 and the side bezel structure 118 may be formed integrally and may include the same material (for example, a metal material such as aluminum).

In the illustrated embodiment, the front plate 102 may include two first areas 110D on both ends of the long edge of the front plate 102 such that the two first areas 110D bend from the first surface 110A toward the rear plate 111 and extend seamlessly. In the illustrated embodiment (see FIG. 2), the rear plate 111 may include two second areas 110E on both ends of the long edge such that the two second areas 110E bend from the second surface 110B toward the front plate 102 and extend seamlessly. In some embodiments, the front plate 102 (or the rear plate 111) may include only one of the first areas 110D (or the second areas 110E). In another embodiment, a part of the first areas 110D or the second areas 110E may not be included. In the above embodiments, when seen from the side surface of the electronic device 100, the side bezel structure 118 may have a first thickness (or width) on a part of the side surface, which does not include the first areas 110D or the second areas 110E as described above, and may have a second thickness that is smaller than the first thickness on a part of the side surface, which includes the first areas 110D or the second areas 110E.

According to an embodiment, the electronic device 100 may include at least one of a display 101, audio modules 103, 107, and 114, sensor modules 104, 116, and 119, camera modules 105, 112, and 113, a key input device 117, a light-emitting element 106, and connector holes 108 and 109. In some embodiments, at least one of the elements (for example, the key input device 117 or the light-emitting element 106) of the electronic device 100 may be omitted, or the electronic device 100 may additionally include another element.

The display 101 may be exposed through a corresponding part of the front plate 102, for example. In some embodiments, at least a part of the display 101 may be exposed through the front plate 102 that forms the first areas 110D of the side surface 110C and the first surface 110A. In some embodiments, the display 101 may have a corner formed in substantially the same shape as that of the adjacent outer periphery of the front plate 102. In another embodiment (not illustrated), in order to increase the area of exposure of the display 101, the interval between the outer periphery of the display 101 and the outer periphery of the front plate 102 may be formed to be substantially identical.

In another embodiment (not illustrated), a recess or an opening may be formed in a part of the screen display area of the display 101, and at least one of an audio module 114, a sensor module 104, a camera module 105, and a light-emitting element 106 may be included and aligned with the recess or the opening. In another embodiment (not illustrated), on the back surface of the screen display area of the display 101, at least one of an audio module 114, a sensor module 104, a camera module 105, a fingerprint sensor 116, and a light-emitting element 106 may be included. In another embodiment (not illustrated), the display 101 may be coupled to or arranged adjacent to a touch sensing circuit, a pressure sensor capable of measuring the intensity (pressure) of a touch, and/or a digitizer that detects a magnetic field-type stylus pen. In some embodiments, at least a part of the sensor modules 104 and 119 and/or at least a part of the key input device 117 may be arranged in the first areas 110D and/or the second areas 110E.

The audio modules 103, 107, and 114 may include a microphone hole 103 and speaker holes 107 and 114. A microphone for acquiring an external sound may be arranged in the microphone hole 103, and a plurality of microphones may be arranged therein such that the direction of a sound can be sensed in some embodiments. The speaker holes 107 and 114 may include an outer speaker hole 107 and a speech receiver hole 114. In some embodiments, the speaker holes 107 and 114 and the microphone hole 103 may be implemented as a single hole, or a speaker may be included (for example, a piezoelectric speaker) without the speaker holes 107 and 114.

The sensor modules 104, 116, and 119 may generate an electric signal or a data value corresponding to the internal operating condition of the electronic device 100 or the external environment condition thereof. The sensor modules 104, 116, and 119 may include, for example, a first sensor module 104 (for example, a proximity sensor) arranged on the first surface 110A of the housing 110, and/or a second sensor module (not illustrated) (for example, a fingerprint sensor), and/or a third sensor module 119 (for example, an HRM sensor) arranged on the second surface 110B of the housing 110, and/or a fourth sensor module 116 (for example, a fingerprint sensor). The fingerprint sensor may be arranged not only on the first surface 110A (for example, the display 101) of the housing 110, but also on the second surface 110B thereof. The electronic device 100 may further include a sensor module not illustrated, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or a luminance sensor 104.

The camera modules 105, 112, and 113 may include a first camera device 105 arranged on the first surface 110A of the electronic device 100, a second camera device 112 arranged on the second surface 110B thereof, and/or a flash 113. The camera devices 105 and 112 may include a single lens or a plurality of lenses, an image sensor, and/or an image signal processor. The flash 113 may include, for example, a light-emitting diode or a xenon lamp. In some embodiments, two or more lenses (an infrared camera, a wide-angle lens, and a telephoto lens) and image sensors may be arranged on a single surface of the electronic device 100.

The key input device 117 may be arranged on the side surface 110C of the housing 110. In another embodiment, the electronic device 100 may not include a part of the above-mentioned key input device 117 or the entire key input device 117, and the key input device 117 (not included) may be implemented in another type, such as a soft key, on the display 101. In some embodiments, the key input device may include a sensor module 116 arranged on the second surface 110B of the housing 110.

The light-emitting element 106 may be arranged on the first surface 110A of the housing 110, for example. The light-emitting element 106 may provide information regarding the condition of the electronic device 100 in a light type, for example. In another embodiment, the light-emitting element 106 may provide a light source that interworks with operation of the camera module 105, for example. The light-emitting element 106 may include, for example, a light-emitting diode (LED), an infrared light-emitting diode (IR LED), and a xenon lamp.

The connector holes 108 and 109 may include a first connector hole 108 capable of containing a connector (for example, a universal serial bus (USB) connector) for transmitting/receiving power and/or data to/from an external electronic device, and/or a second connector hole (for example, an earphone jack) 109 capable of containing a connector for transmitting/receiving an audio signal to/from the external electronic device.

Figure 3:
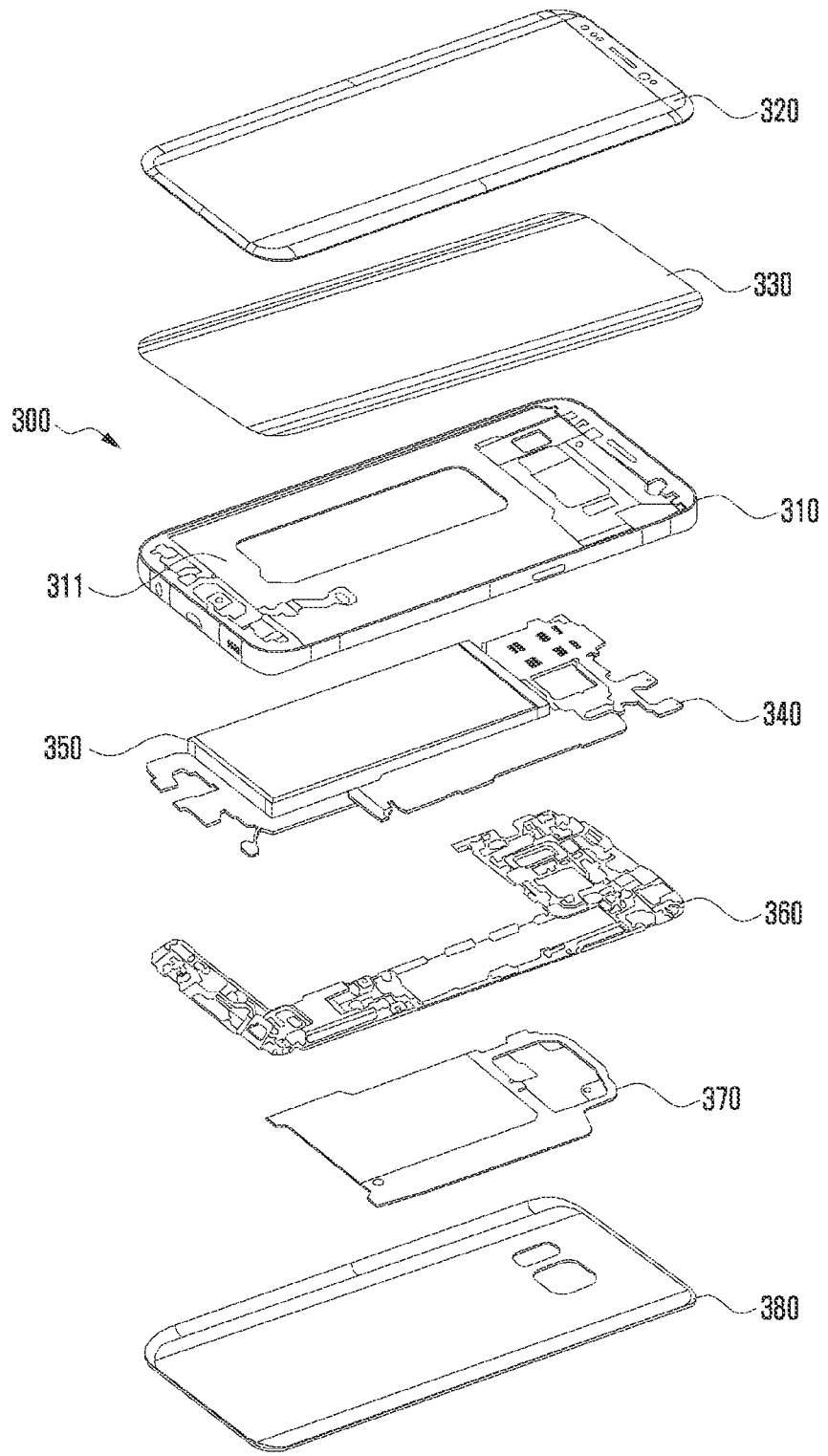
FIG. 3 is an exploded perspective view illustrating the mobile electronic device shown in FIGS. 1 and 2 according to an embodiment of the disclosure.

FIG. 3 is an exploded perspective view illustrating the electronic device of FIG. 1 according to an embodiment of the disclosure.

Referring to FIG. 3, an electronic device 300 may include a side bezel structure 310, a first support member 311 (for example, a bracket), a front plate 320, a display 330, a printed circuit board 340, a battery 350, a second support member 360 (for example, a rear case), an antenna 370, and a rear plate 380. In some embodiments, at least one of the elements (for example, the first support member 311 or the second support member 360) of the electronic device 300 may be omitted, or the electronic device 300 may further include another element. At least one of the elements of the electronic device 300 may be identical or similar to at least one of the elements of the electronic device 100 of FIG. 1 or FIG. 2, and repeated descriptions thereof will be omitted herein.

The first support member 311 may be arranged inside the electronic device 300 and connected to the side bezel structure 310, or may be formed integrally with the side bezel structure 310. The first support member 311 may be made of a metal material and/or a nonmetal (for example, polymer) material, for example. The display 330 may be coupled to one surface of the first support member 311, and the printed circuit board 340 may be coupled to the other surface thereof. A processor, a memory, and/or an interface may be mounted on the printed circuit board 340. The processor may include, for example, one or more of a central processing device, an application processor, a graphic processing device, an image signal processor, a sensor hub processor, or a communication processor.

The memory may include a volatile memory or a non-volatile memory, for example.

The interface may include, for example, a high definition multimedia interface (HDMI), a universal serial bus (USB) interface, a secure digital (SD) card interface, and/or an audio interface. The interface may connect the electronic device 300 with an external electronic device electrically or physically, for example, and may include a USB connector, an SD card/multi-media card (MMC) connector, or an audio connector.

The battery 350 is a device for supplying power to at least one element of the electronic device 300, and may include a non-rechargeable primary cell, a rechargeable secondary cell, or a fuel cell, for example. At least a part of the battery 350 may be arranged on substantially the same plane with the printed circuit board 340, for example. The battery 350 may be arranged integrally inside the electronic device 300, or may be arranged such that the same can be attached to/detached from the electronic device 300.

The antenna 370 may be arranged between the rear plate 380 and the battery 350. The antenna 370 may include, for example, a near field communication (NFC) antenna, a wireless charging antenna, and/or a magnetic secure transmission (MST) antenna. The antenna 370 may conduct near-field communication with an external device or may wirelessly transmit/receive power necessary for charging, for example. In another embodiment, an antenna structure may be formed by a part or a combination of the side bezel structure 310 and/or the first support member 311.

The electronic devices may include at least one of various medical devices (e.g., various portable medical measurement devices (such as blood glucose meters, heart rate monitors, blood pressure monitors, or thermometers, and the like), a magnetic resonance angiography (MRA) device, a magnetic resonance imaging (MRI) device, a computed tomography (CT) device, scanners, or ultrasonic devices, and the like), navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller machines (ATMs), points of sales (POSs) devices, or Internet of Things (IoT) devices (e.g., light bulbs, various sensors, electric or gas meters, sprinkler devices, fire alarms, thermostats, street lamps, toasters, exercise equipment, hot water tanks, heaters, boilers, and the like).

The electronic devices may further include at least one of parts of furniture or buildings/structures, electronic boards, electronic signature receiving devices, projectors, or various measuring instruments (such as water meters, electricity meters, gas meters, or wave meters, and the like). The electronic devices may be one or more combinations of the above-mentioned devices. The electronic devices may be flexible electronic devices. Also, the electronic devices are not limited to the above-mentioned devices, and may include new electronic devices according to the development of new technologies.

Embodiments of the disclosure will be described in greater detail below with reference to the accompanying drawings. However, the embodiments of the disclosure are not limited to the specific embodiments and should be understood as including all modifications, changes, equivalent devices and methods, and/or alternative embodiments of the disclosure.

The terms "A or B," "at least one of A or/and B," or "one or more of A or/and B" as used herein include all possible combinations of items enumerated with them. For example, "A or B," "at least one of A and B," or "at least one of A or B" may refer, for example, to (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. It will also be understood that, when an element (for example, a first element) is "directly coupled with/to" or "directly connected to" another element (for example, a second element), there is no intervening element (for example, a third element) between the element and another element.

The term "module" as used herein may be defined as, for example, a unit including one of hardware, software, and firmware or any combinations thereof. The term "module" may be interchangeably used with, for example, the terms "unit", "logic", "logical block", "component", or "circuit", and the like. The "module" may be a minimum unit of an integrated component or a part thereof. The "module" may be a minimum unit performing one or more functions or a part thereof.

Figure 4:
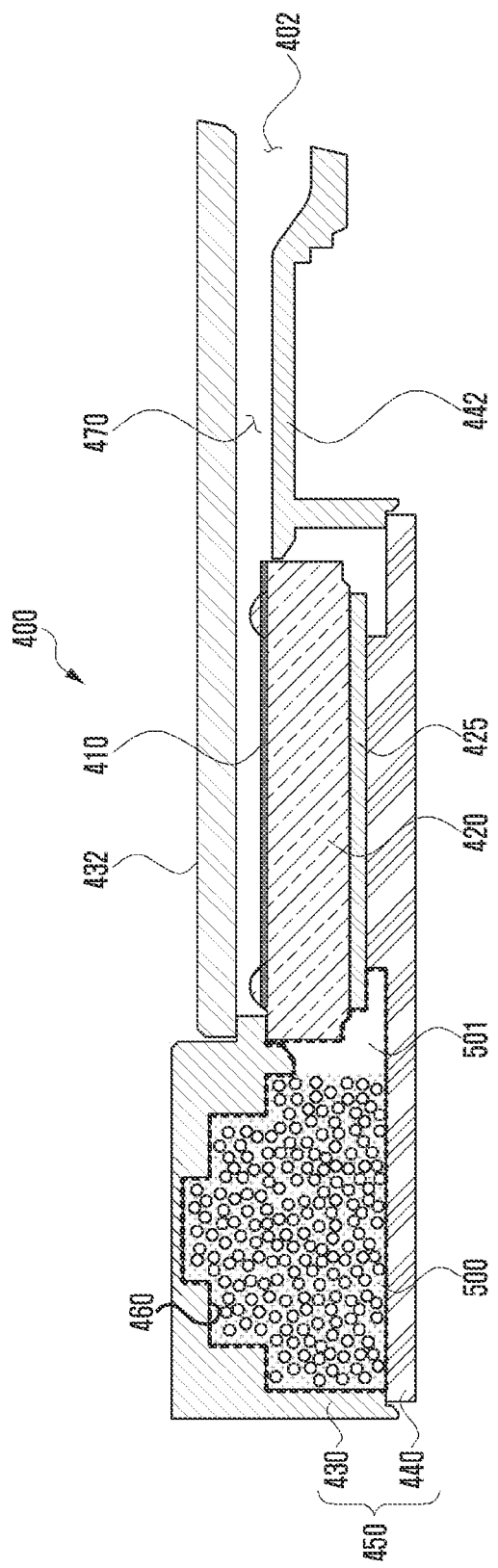
FIG. 4 is a cross-sectional view illustrating an example configuration of an example electronic device including an air adsorption member and a speaker module according to an embodiment of the disclosure.

FIG. 4 is a cross-sectional view illustrating an example configuration of an electronic device including an air adsorption member and a speaker module according to an embodiment of the disclosure.

Referring to FIG. 4, the electronic device 400 (e.g., the electronic device 100 in FIG. 1 or the electronic device 300 in FIG. 3) according to an embodiment may include a diaphragm 410, a speaker module (e.g., including a speaker) 420, a housing 450 (e.g., the housing 110 in FIG. 1), a first space 460, a second space 470, and an air adsorption member 500.

According to an embodiment, the diaphragm 410 may produce sound through an upward and downward vibration. The sound produced through the vibration of the diaphragm 410 may be output through a sound output port 402 formed or provided in a certain direction.

According to an embodiment, the speaker module 420 may be disposed under the diaphragm 410. The speaker module 420 may convert an electrical signal received, for example, from a printed circuit board (e.g., the PCB 340 in FIG. 3) of the electronic device 400 into a sound signal through the vibration of the diaphragm 410. According to various embodiments, the speaker module 420 may include various speaker components such as, for example, and without limitation, a yoke, a magnet, a plate, a voice coil, or the like.

According to an embodiment, the housing 450 may accommodate the speaker module 420. The housing 450 may include a first housing 430 (e.g., an upper housing) and a second housing 440 (e.g., a lower housing). The housing 450 may include the first housing 430 and the second housing 440 combined with each other. The first housing 430 and the second housing 440 may be disposed above and under the speaker module 420, respectively. The first housing 430 may, for example, be formed of a single material (e.g., metal) and extend above the speaker module 420. The first housing 430 may be combined with a first plate 432 formed, for example, of another material (e.g., plastic). The second housing 440 may, for example, be formed of a single material (e.g., metal) and extend under the speaker module 420. The second housing 440 may be combined with a second plate 442 formed, for example, of another material (e.g., plastic).

According to various embodiments, a support member (e.g., a support) 425 may be disposed between the second housing 440 and the speaker module 420. The support member 425 may absorb a shock transmitted to the second housing 440 through the speaker module 420 when the diaphragm 410 disposed above the speaker module 420 vibrates. The support member 425 may include, for example, and without limitation, a sponge, a nonwoven fabric, or the like, or any equivalent thereof. According to an embodiment, the support member 425 may be omitted. In this case, the speaker module 420 and the second housing 440 may be integrally formed. The left side of the speaker module 420 may include, at least in part, a stepped portion. The speaker module 420 may be spatially connected to the first space 460 through a ventilation hole (not shown) formed on at least a portion of the left side thereof.

According to an embodiment, the housing 450 may define the first space 460 and the second space 470. The first space 460 may be provided in a first direction (e.g., leftward) from the diaphragm 410 and the speaker module 420. The second space 470 may be provided in a second direction (e.g., rightward) from the diaphragm 410 and the speaker module 420.

According to various embodiments, the first space 460 may be spatially connected to the ventilation hole (not shown) provided on at least a portion of the left side of the speaker module 420 to allow air to pass through. Other than this, the first space 460 may be sealed. The second space 470 may be provided to connect the diaphragm 410 and the sound output port 402. The second space 470 may be open without being sealed. The speaker module 420 may have a ventilation structure in which the diaphragm 410 and the second space 470 are spatially connected to allow air to pass through.

According to an embodiment, the air adsorption member 500 may be provided at least in part in the first space 460. The air adsorption member 500 may, for example, include a solidified mixture having a molecular structure of particles and binders, or any other suitable air adsorption material, and may facilitate the adsorption and relaxation of the air 501 contained in the first space 460. The air adsorption member 500 may, for example, have a volume ratio in a range of about 70% to about 90% of the first space 460. In the first space 460, a space other than the air adsorption member 500 may, for example, be filled with the air 501.

The aforementioned volume ratio of about 70% to about 90% is an example only and it will be understood that the disclosure is not limited to this ratio. For example, according to various embodiments, the first space 160 may contain the air adsorption member 500 ranging from about 10% to about 99% in volume ratio and also contain the air 501 in the remaining space.

Figure 5:
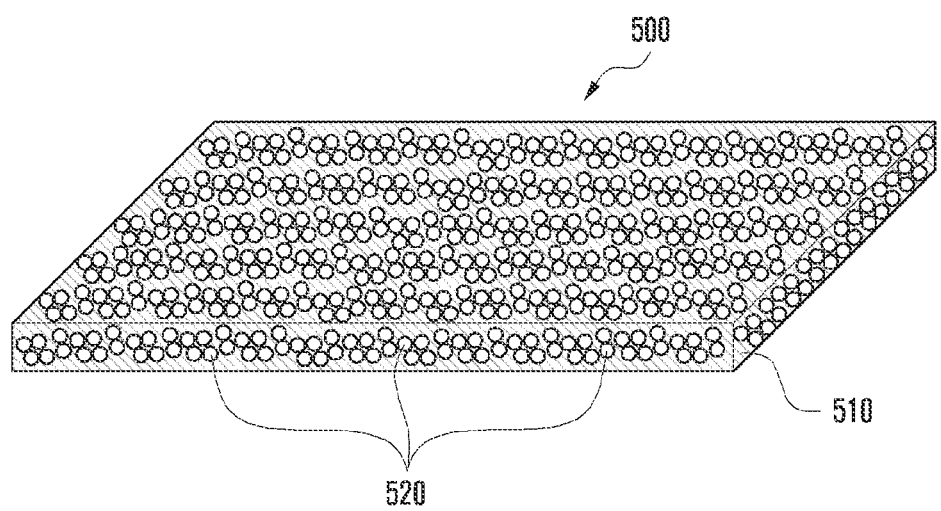
FIG. 5 is a diagram illustrating an example air adsorption member included in an electronic device according to an embodiment of the disclosure.
Figure 6:
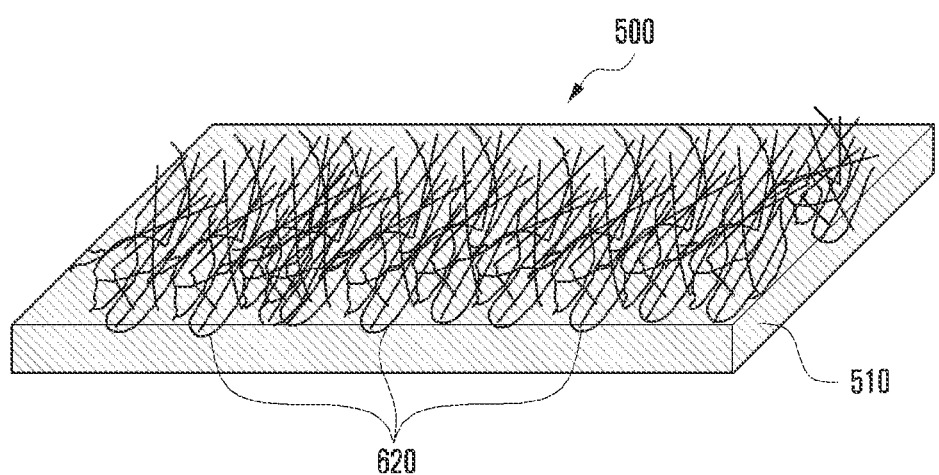
FIG. 6 is a diagram illustrating an example air adsorption member included in an electronic device according to an embodiment of the disclosure.

FIG. 5 is a diagram illustrating an example air adsorption member included in an electronic device according to an embodiment of the disclosure. FIG. 6 is a diagram illustrating an air adsorption member included in an electronic device according to an embodiment of the disclosure.

Referring to FIG. 5, the air adsorption member 500 may be formed by applying an air adsorption material 520 to a sheet 510. The sheet 510 may be formed of a porous material. Absorbing the air adsorption material 520, the sheet 510 may be solidified. The sheet 510 may have a solid material including lumps connected by a binder.

Referring to FIG. 6, the air adsorption member 500 may be formed by embedding nanofibers 620 including an air adsorption material in the sheet 510.

According to an embodiment, when the air 501 in the first space 460 is compressed by the vibration of the diaphragm 410 disposed above the speaker module 420 shown in FIG. 4, the air adsorption material 520 of the air adsorption member 500 may positively adsorb air and thereby minimize and/or reduce air resistance to the diaphragm 410.

According to an embodiment, when the air 501 in the first space 460 is relaxed or expanded by the vibration of the diaphragm 410 disposed above the speaker module 420, the air adsorption material 520 of the air adsorption member 500 may negatively adsorb air and thereby minimize and/or reduce air resistance to the diaphragm 410.

Figure 7:
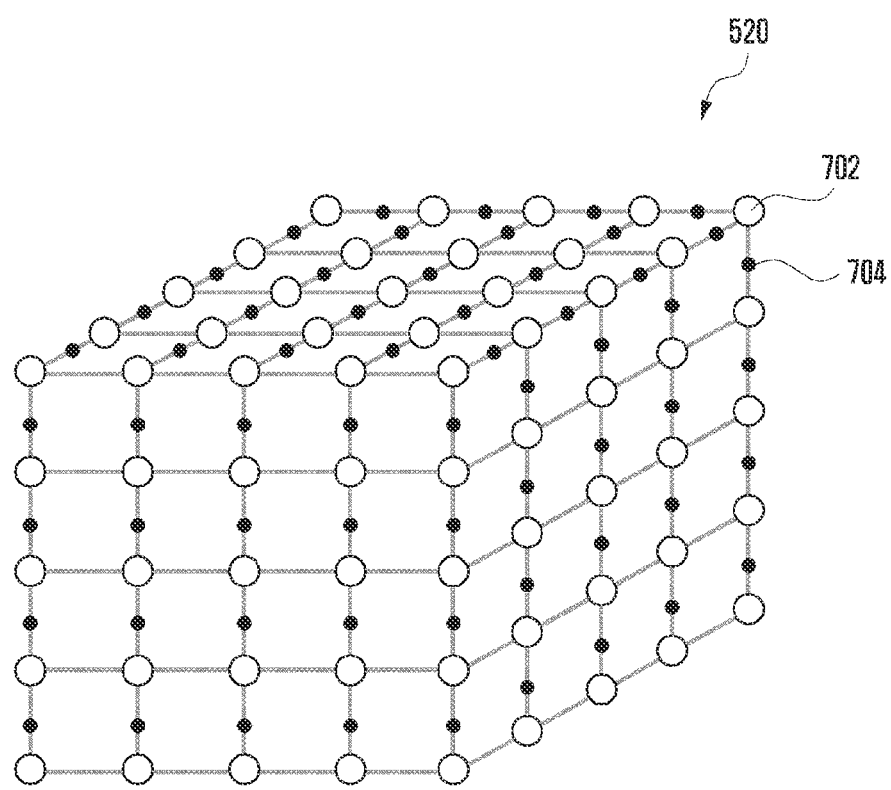
FIG. 7 is a diagram illustrating a molecular structure of an example air adsorption material included in an electronic device according to various embodiments of the disclosure.

FIG. 7 is a diagram illustrating a molecular structure of an example air adsorption material included in an electronic device according to various embodiments of the disclosure.

Referring to FIG. 7, the air adsorption material 520 according to various embodiments may include a mixture having a molecular structure of particles 702 and binders 704 to perform positive and negative adsorptions of air.

According to an embodiment, the air adsorption material 520 may be formed, for example, by mixing binders with at least one of granular activated carbon, powdered activated carbon, or acid red 27-crosslinked polyaniline (ARCP).

According to an embodiment, the air adsorption material 520 may be formed, for example, by mixing binders with Cu, Po1, Zr1, Zr2, or Al particles having a metal organic frameworks structure.

According to an embodiment, the air adsorption material 520 may be formed, for example, by mixing binders with at least one of a diatomaceous earth element, a pearlite or silicon dioxide element, or a zeolite element.

According to an embodiment, the air adsorption material 520 may be formed, for example, to have a specific surface area greater than the surface area of a single solid matter. The air adsorption material 520 may be formed, for example, to have a structure capable of increasing the adsorption efficiency of specific element(s) such as, for example, and without limitation, nitrogen ($N_2$) and/or oxygen ($O_2$) contained in the air.

Figure 8:
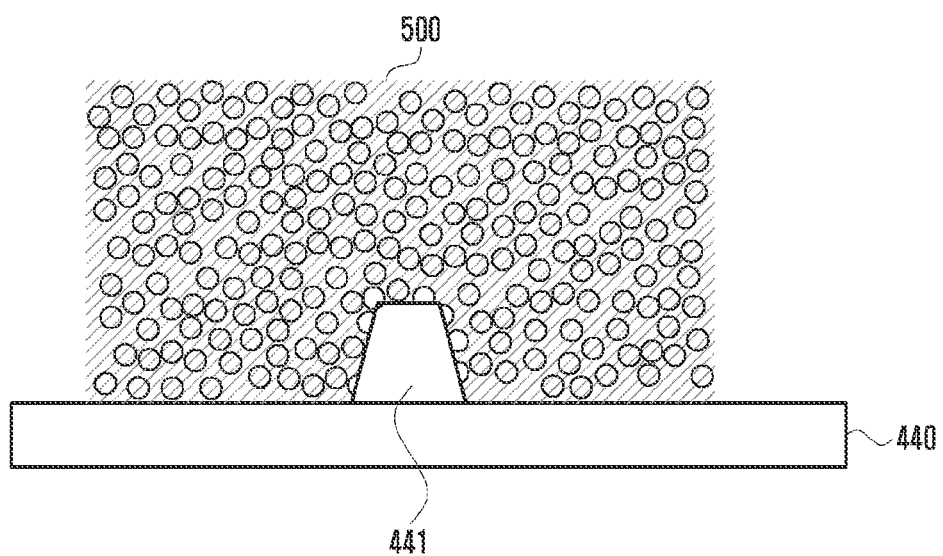
FIG. 8 is a diagram illustrating an example air adsorption member fixed to a housing of an electronic device according to an embodiment of the disclosure.

FIG. 8 is a diagram illustrating an example air adsorption member fixed to a housing of an electronic device according to an embodiment of the disclosure.

In describing the embodiment illustrated in FIG. 8, the description of the same configuration and functions as those of the above-described embodiments shown in FIGS. 4, 5, 6 and 7 may be omitted.

Referring to FIG. 8, the air adsorption member 500 may be fixed to the second housing 440 (e.g., the lower housing) through a fixing member 441 formed on the second housing 440 and thereby disposed in the first space 460.

According to an embodiment, the fixing member 441 may be formed at a certain position of the second housing 440. The fixing member 441 may be or include, for example, a convex or protruding portion. The fixing member 441 may, for example, be integrally formed with the second housing 440.

Figure 9:
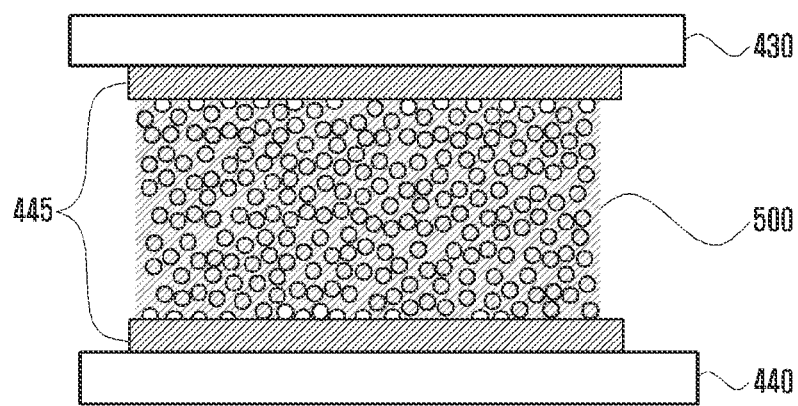
FIG. 9 is a diagram illustrating an example air adsorption member fixed to a housing of an electronic device according to an embodiment of the disclosure.

FIG. 9 is a diagram illustrating an example air adsorption member fixed to a housing of an electronic device according to an embodiment of the disclosure.

In describing the embodiment illustrated in FIG. 9, the description of the same configuration and functions as those of the above-described embodiments shown in FIGS. 4, 5, 6 and 7 may be omitted.

Referring to FIG. 9, the air adsorption member 500 may be interposed between shock absorbing members 445 formed on an inner side of the first housing 430 (e.g., the upper housing) and an inner side of the second housing 440 (e.g., the lower housing), respectively, and thereby disposed in the first space 460.

According to an embodiment, the shock absorbing member 445 may be or include, for example, and without limitation, a sponge. The shock absorbing member 445 may prevent and/or reduce the solidified air adsorption member 500 from being impacted inside the first space 460. The shock absorbing member 445 may be provided to only one of the inner side of the first housing 430 and the inner side of the second housing 440.

Figure 10:
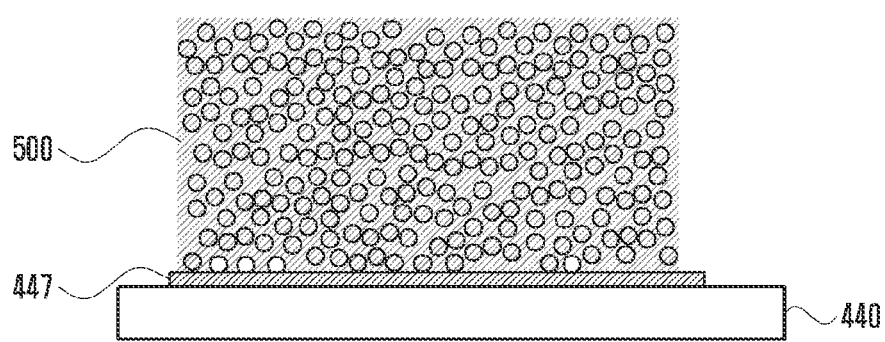
FIG. 10 is a diagram illustrating an example air adsorption member fixed to a housing of an electronic device according to an embodiment of the disclosure.

FIG. 10 is a diagram illustrating an example air adsorption member fixed to a housing of an electronic device according to an embodiment of the disclosure.

In describing the embodiment illustrated in FIG. 10, the description of the same configuration and functions as those of the above-described embodiments shown in FIGS. 4, 5, 6 and 7 may be omitted.

Referring to FIG. 10, the air adsorption member 500 may be adhered, for example, to an adhesive tape 447 provided on an inner side of the second housing 440 (e.g., the lower housing) and thereby disposed in the first space 460.

The air adsorption member 500 may be adhered, for example, to the adhesive tape 447 formed on an inner side of the first housing 430 (e.g., the upper housing) (not shown) and thereby disposed in the first space 460.

Figure 11:
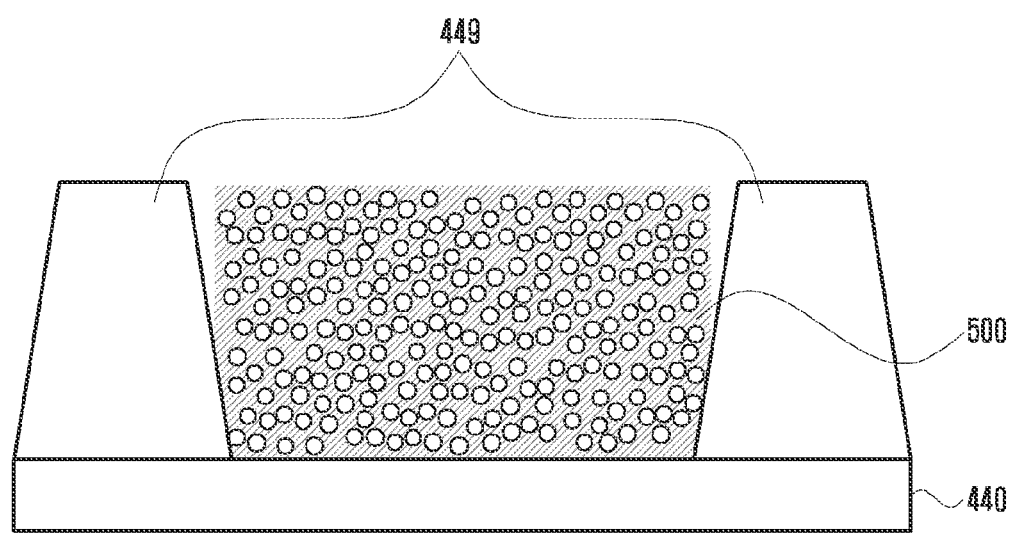
FIG. 11 is a diagram illustrating an example air adsorption member fixed by a rib formed in a housing of an electronic device according to an embodiment of the disclosure.

FIG. 11 is a diagram illustrating an example air adsorption member fixed by a rib formed in a housing of an electronic device according to an embodiment of the disclosure.

In describing the embodiment illustrated in FIG. 11, the description of the same configuration and functions as those of the above-described embodiments shown in FIGS. 4, 5, 6 and 7 may be omitted.

Referring to FIG. 11, the air adsorption member 500 may be fixed, for example, to a pair of ribs 449 formed on the second housing 440 (e.g., the lower housing) of the electronic device 400 and thereby disposed in the first space 460.

According to an embodiment, the second housing 440 may include the pair of ribs 449 formed on an inner side of the second housing 440 and spaced apart from each other. The ribs 449 may be integrally formed with the second housing 440. The air adsorption member 500 may be fixed by, for example, being inserted between the pair of ribs 449.

Figure 12:
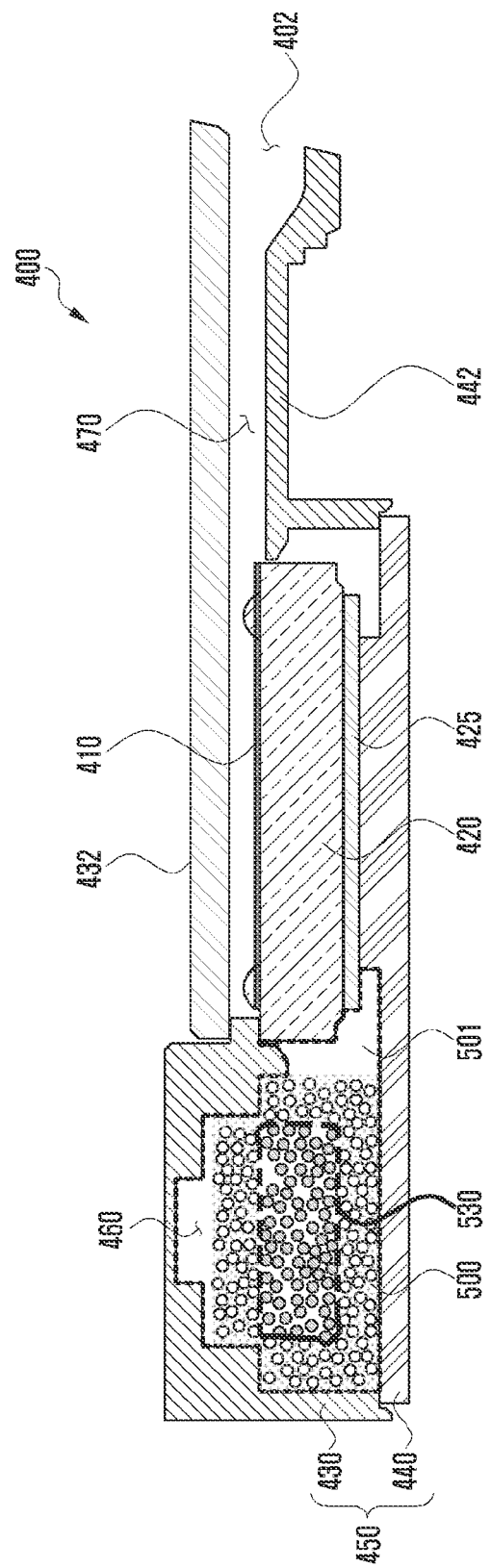
FIG. 12 is a cross-sectional view illustrating an example configuration of an electronic device including an air adsorption member and a speaker module according to an embodiment of the disclosure.

FIG. 12 is a cross-sectional view illustrating an example configuration of an electronic device including an air adsorption member and a speaker module according to an embodiment of the disclosure.

In describing the embodiment illustrated in FIG. 12, the description of the same configuration and functions as those of the above-described embodiments shown in FIGS. 4, 5, 6 and 7 may be omitted.

Referring to FIG. 12, the air adsorption member 500 may be disposed at least in part in the first space 460. The first space 460 may contain the air 501.

According to an embodiment, the air adsorption member 500 may be in a solidified state. An outer side of the air adsorption member 500 may be combined, at least in part, with the housing 450 forming the first space 460, and an inner side of the air adsorption member 500 may be filled with a homogeneous or heterogeneous powder and granulated mixture 530.

Figure 13:
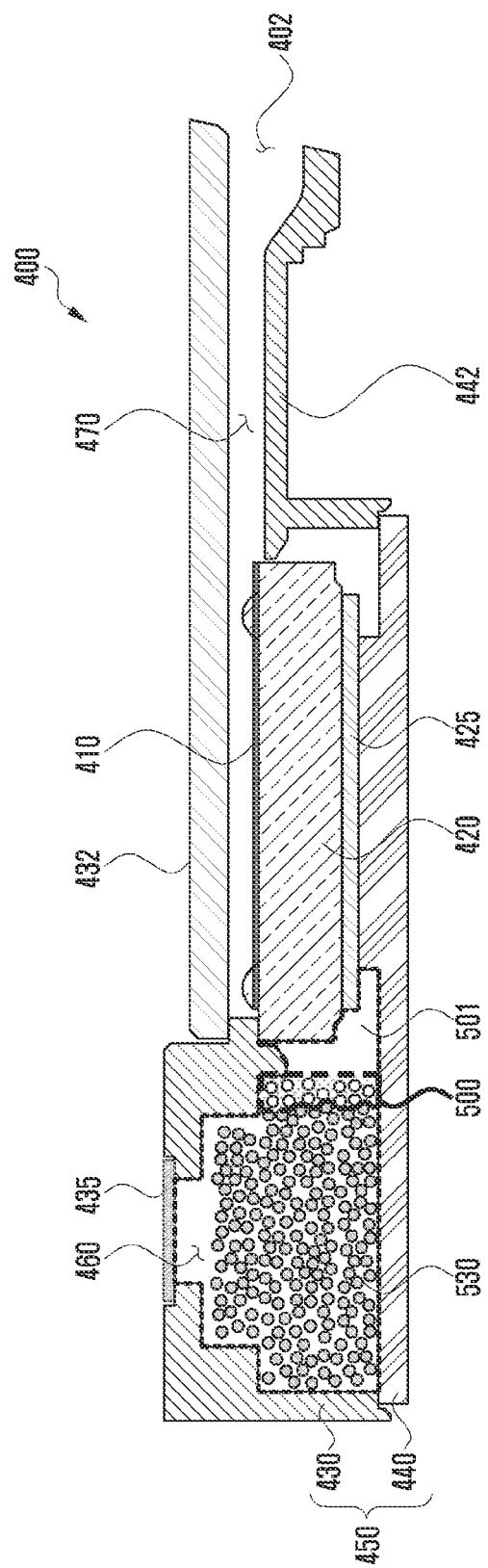
FIG. 13 is a cross-sectional view illustrating an example configuration of an electronic device including an air adsorption member and a speaker module according to an embodiment of the disclosure.

FIG. 13 is a cross-sectional view illustrating an example configuration of an electronic device including an air adsorption member and a speaker module according to an embodiment of the disclosure.

In describing the embodiment illustrated in FIG. 13, the description of the same configuration and functions as those of the above-described embodiments shown in FIGS. 4, 5, 6 and 7 may be omitted.

Referring to FIG. 13, at least a portion of the solidified air adsorption member 500 may be combined with the housing 450 at a position adjacent to the speaker module 420, thereby forming a partition wall.

According to an embodiment, a ventilation mesh 435 may be provided to an upper portion of the first housing 430. The first space 460 may be filled with the homogeneous or heterogeneous powder and granulated mixture 530. The powder and granulated mixture 530 may not invade the speaker module 420 due to the partition wall. The powder and granulated mixture 530 may be injected into at least a portion of the first space 460, which may be then sealed by the ventilation mesh 435. The ventilation mesh 435 may be replaced with the air adsorption member 500.

Figure 14:
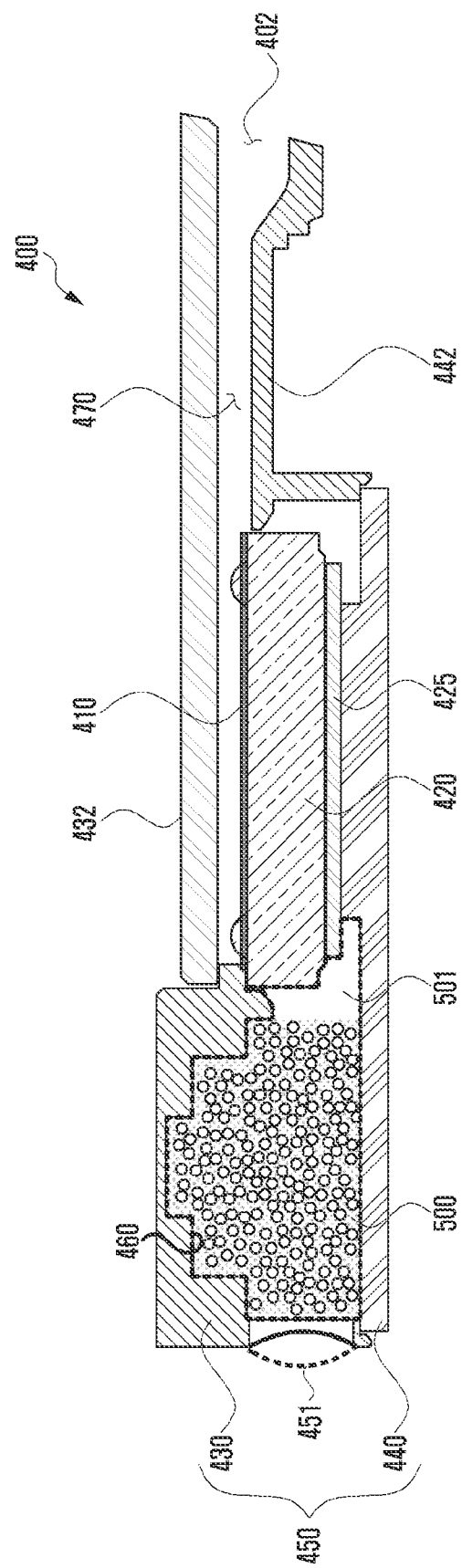
FIG. 14 is a cross-sectional view illustrating an example configuration of an electronic device including an air adsorption member and a speaker module according to an embodiment of the disclosure.

FIG. 14 is a cross-sectional view illustrating an example configuration of an electronic device including an air adsorption member and a speaker module according to an embodiment of the disclosure.

In describing the embodiment illustrated in FIG. 14, the description of the same configuration and functions as those of the above-described embodiments shown in FIGS. 4, 5, 6 and 7 may be omitted.

Referring to FIG. 14, the electronic device 400 may include a passive radiator 451. A portion of the housing 450, e.g., a portion of the first housing 430 adjacent to the second housing 440, may be removed and replaced with the passive radiator 451 adjacent the first space 460.

According to an embodiment, the first space 460 may be filled at least in part with the air adsorption member 500. The air adsorption member 500 may have a volume ratio of less than about 100% of the first space 460. In the first space 460, a space other than the air adsorption member 500 may be filled with the air 501.

Figure 15:
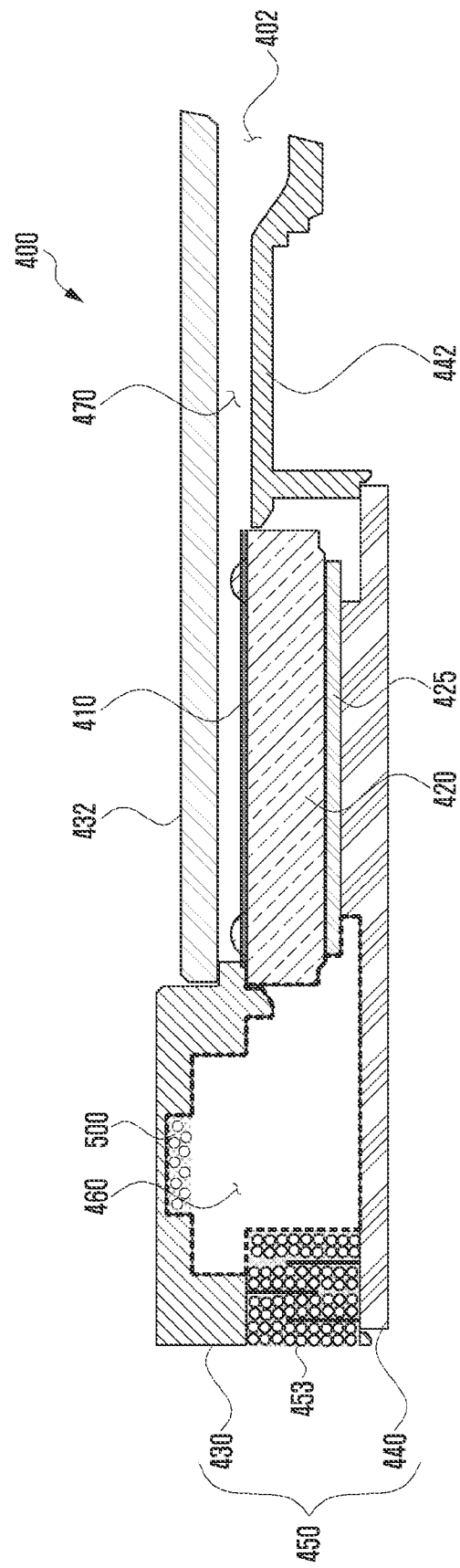
FIG. 15 is a cross-sectional view illustrating an example configuration of an electronic device including an air adsorption member and a speaker module according to an embodiment of the disclosure.

FIG. 15 is a cross-sectional view illustrating an example configuration of an electronic device including an air adsorption member and a speaker module according to an embodiment of the disclosure.

In describing the embodiment illustrated in FIG. 15, the description of the same configuration and functions as those of the above-described embodiments shown in FIGS. 4, 5, 6 and 7 may be omitted.

Referring to FIG. 15, the electronic device 400 may include a duct 453. A portion of the housing 450, e.g., a portion of the first housing 430 adjacent to the second housing 440, may be removed and replaced with the duct 453 adjacent the first space 460. The duct 453 may increase a sound pressure of a specific frequency band through phase inversion. The duct 453 may, for example, contain holes with curved paths to realize phase inversion and compensate for a specific frequency.

According to an embodiment, the first space 460 may be filled at least in part with the air adsorption member 500. For example, when the ventilation mesh 435 shown in FIG. 13 is formed at the upper portion of the first housing 430, the air adsorption member 500 may be provided around the ventilation mesh 435.

Figure 16:
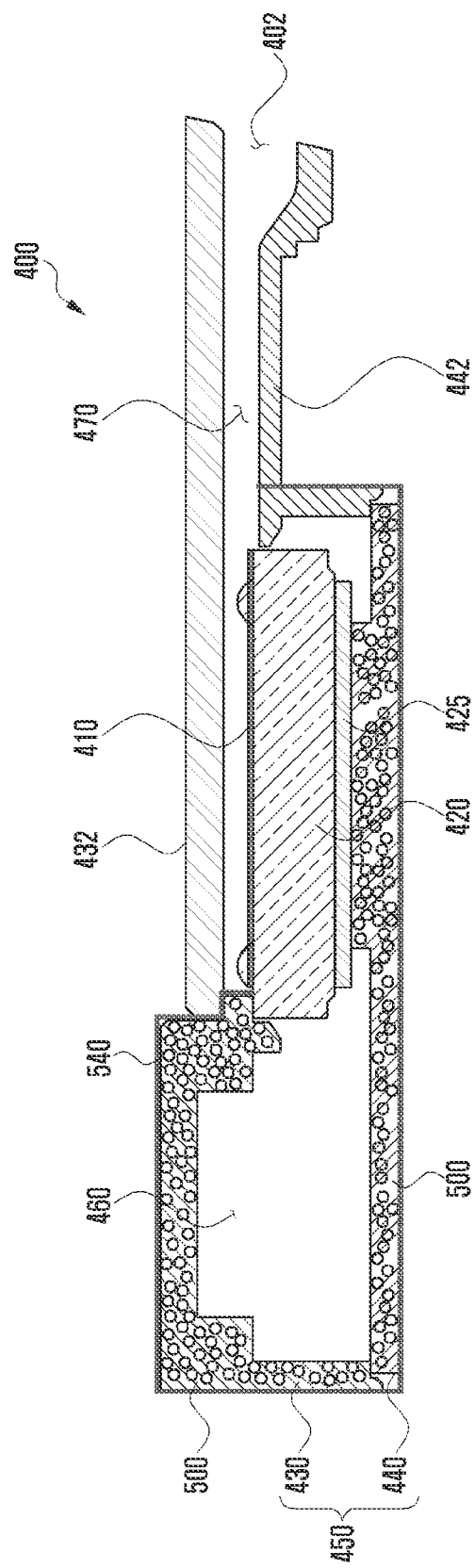
FIG. 16 is a cross-sectional view illustrating an example configuration of an electronic device including an air adsorption member and a speaker module according to an embodiment of the disclosure.

FIG. 16 is a cross-sectional view illustrating an example configuration of an electronic device including an air adsorption member and a speaker module according to an embodiment of the disclosure.

In describing the embodiment illustrated in FIG. 16, the description of the same configuration and functions as those of the above-described embodiments shown in FIGS. 4, 5, 6 and 7 may be omitted.

Referring to FIG. 16, the electronic device 400 may include the air adsorption member 500 that replaces a part or all of the first housing 430 and the second housing 440.

According to an embodiment, outer surfaces of the first and second housings 430 and 440 replaced by the air adsorption member 500 may be coated with a coating member 540. The coating member 540 may prevent and/or reduce the sound from leaking to the outside of the first space 460.

According to various embodiments, only a part of the first and second housings 430 and 440 may be replaced by the air adsorption member 500. In this case, the outer surface of the air adsorption member 500 may be treated by heat, pressure, or ultraviolet (UV) light. This is to eliminate and/or reduce a function of compressing and relaxing the air such that the sound does not leak to the outside through the first space 460.

According to various embodiments, when only a part of the first and second housings 430 and 440 is replaced by the air adsorption member 500, the outer surface of the air adsorption member 500 may be covered with a tape or any equivalent such that the sound does not leak (or leakage is reduced) to the outside through the first space 460.

Figure 17:
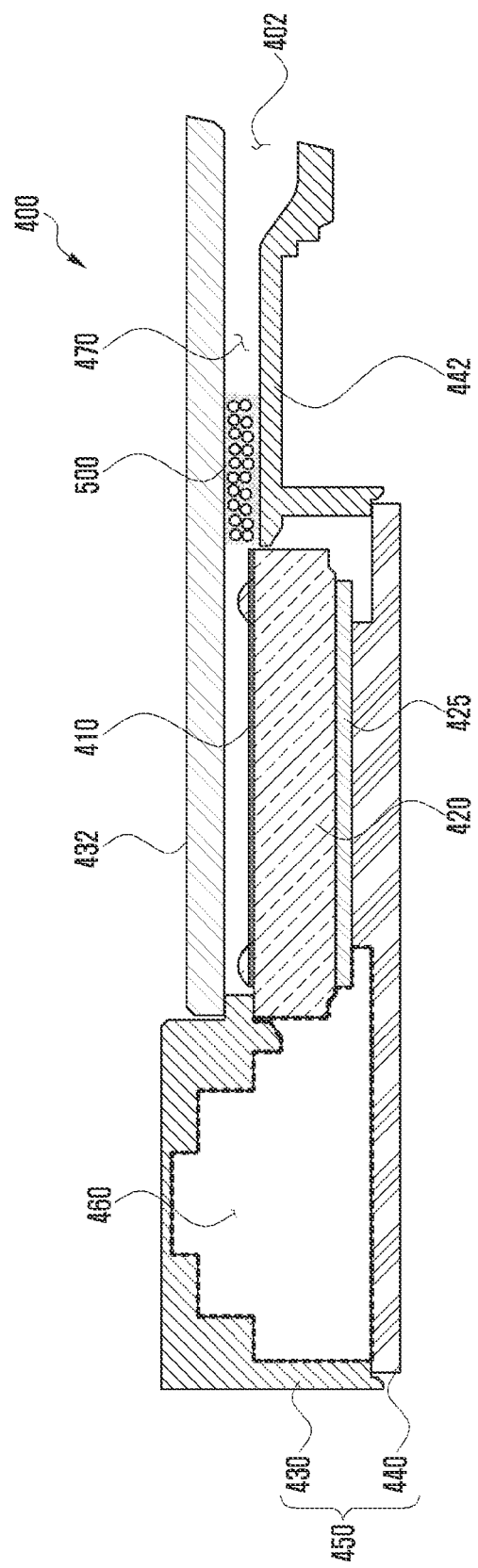
FIG. 17 is a cross-sectional view illustrating an example configuration of an electronic device including an air adsorption member and a speaker module according to an embodiment of the disclosure.

FIG. 17 is a cross-sectional view illustrating an example configuration of an electronic device including an air adsorption member and a speaker module according to an embodiment of the disclosure.

In describing the embodiment illustrated in FIG. 17, the description of the same configuration and functions as those of the above-described embodiments shown in FIGS. 4, 5, 6, 7 and 16 may be omitted.

Referring to FIG. 17, the electronic device 400 may include the air adsorption member 500 disposed at least in part in the second space 470 between the diaphragm 410 and the sound output port 402. In this case, the air adsorption member 500 may improve noise for the sound output to the sound output port 402 through the diaphragm 410.

Figure 18:
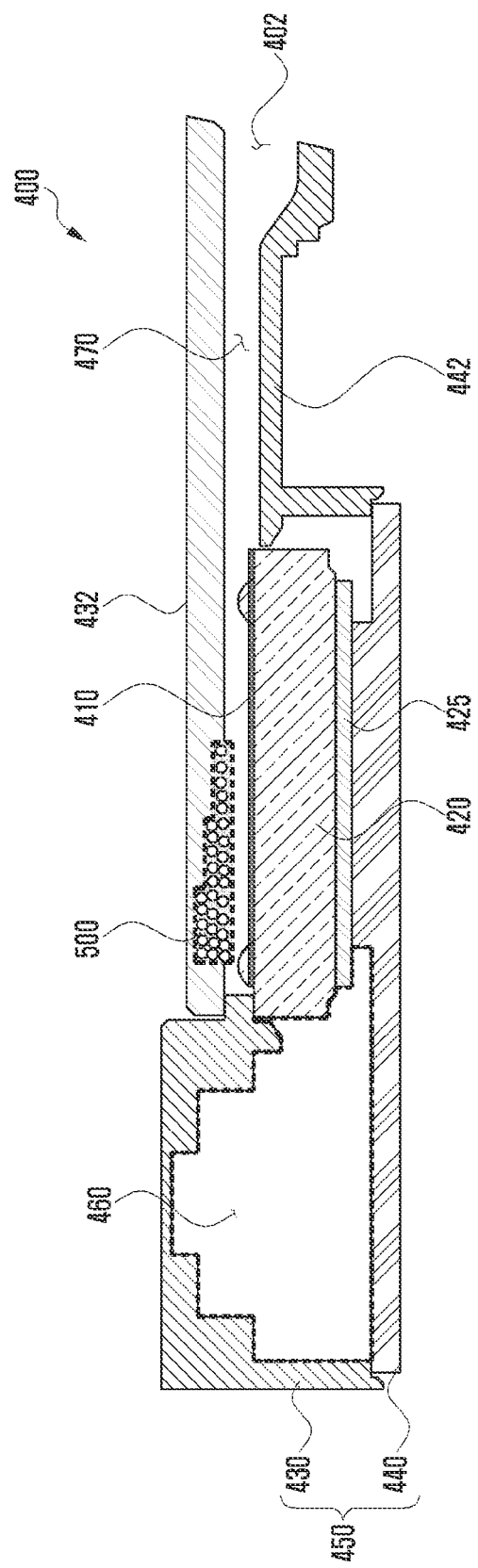
FIG. 18 is a cross-sectional view illustrating an example configuration of an electronic device including an air adsorption member and a speaker module according to an embodiment of the disclosure.

FIG. 18 is a cross-sectional view illustrating an example configuration of an electronic device including an air adsorption member and a speaker module according to an embodiment of the disclosure.

In describing the embodiment illustrated in FIG. 18, the description of the same configuration and functions as those of the above-described embodiments shown in FIGS. 4, 5, 6, 7, 16 and 17 may be omitted.

Referring to FIG. 18, the electronic device 400 may include the air adsorption member 500 provided in at least a part of the first housing 430 (or the first plate 432) disposed over the diaphragm 410.

According to an embodiment, the air adsorption member 500 provided in at least a part of the first housing 430 (or the first plate 432) may be positioned to be biased toward one side of the diaphragm 410. For example, the air adsorption member 500 may be disposed at a position to minimize and/or reduce eccentric vibration of the diaphragm 410. The air adsorption member 500 may be disposed at a position where the upper resistance of the diaphragm 410 is relatively large.

According to various example embodiments of the disclosure, an electronic device may include: a diaphragm; a speaker module comprising a speaker configured to output a sound through a vibration of the diaphragm; a housing accommodating the diaphragm and the speaker module therein and including a first space provided in a first direction from the speaker module and a second space provided in a second direction opposite the first direction; and an air adsorption member comprising an air adsorption material disposed in the first space and having a volume ratio in a range of 90% or less of the first space.

According to various example embodiments, the air adsorption member may be solidified at least in part.

According to various example embodiments, the first space may be sealed and may contain air at least in part.

According to various example embodiments, the housing may include a first housing disposed above the diaphragm; and a second housing 440 disposed under the speaker module.

According to various example embodiments, the air adsorption member may be fixed to a fixing member formed on the second housing.

According to various example embodiments, the air adsorption member may be combined with a shock absorbing member provided on at least one of an inner side of the first housing or an inner side of the second housing.

According to various example embodiments, the air adsorption member may be adhered to an adhesive tape provided on at least one of an inner side of the first housing or an inner side of the second housing.

According to various example embodiments, the air adsorption member may be fixed between a pair of ribs provided on the second housing.

According to various example embodiments, the air adsorption member may comprise an air adsorption material applied to a sheet, and the air adsorption material may have a molecular structure of particles and binders configured to perform positive and negative adsorptions of air.

According to various example embodiments, the air adsorption member may be solidified at least in part, an outer side of the air adsorption member may be combined with the housing forming the first space, and an inner side of the air adsorption member may be filled with a homogeneous or heterogeneous powder and granulated mixture.

According to various example embodiments, the air adsorption member may be solidified at least in part and combined with the housing at a position adjacent to the speaker module, thereby forming a partition wall in the first space 460.

According to various example embodiments, the first space separated by the partition wall may be filled at least in part with a homogeneous or heterogeneous powder and granulated mixture.

According to various example embodiments, the housing may have a ventilation mesh provided to an upper portion thereof, and the ventilation mesh may be formed of the air adsorption member.

According to various example embodiments, the electronic device may further include a passive radiator or a duct provided at a predetermined position with respect to the first space.

According to various example embodiments of the disclosure, an electronic device may include: a diaphragm; a speaker module comprising a speaker configured to output a sound through a vibration of the diaphragm; a housing accommodating the diaphragm and the speaker module therein, of the housing including a first housing disposed at an upper position and a second housing disposed at a lower position, and including a first space formed in a first direction from the speaker module and a second space formed in a second direction opposite the first direction; and an air adsorption member provided in at least a part of the first and/or second housing and/or disposed between the first and second housings, the air adsorption member configured to adsorb air in the first space and/or the second space.

According to various example embodiments, an outer surface of the air adsorption member may be coated with a coating member.

According to various example embodiments, an outer surface of the air adsorption member may be treated at least in part to eliminate and/or reduce a function of compressing and relaxing the air and thereby prevent and/or reduce the sound from leaking to an outside of the first space.

According to various example embodiments, the first space may be sealed and may contain air at least in part.

According to various embodiments, the second space may be provided between the diaphragm and a sound output port, and the air adsorption member may be disposed at a predetermined position of the second space.

According to various example embodiments, at least a part of the first housing disposed over the diaphragm may contain the air adsorption member to minimize and/or reduce eccentric vibration of the diaphragm.

While the disclosure has been illustrated and described with reference to various example embodiments thereof, it will be understood that the various example embodiments are intended to be illustrative, not limiting. One of ordinary skill in the art will understand that various changes in form and details may be made therein without departing from the true spirit and full scope of the disclosure, including the appended claims and their equivalents.

What is claimed is:

1. An electronic device comprising:
a speaker module comprising a speaker configured to output a sound through a vibration of a diaphragm of the speaker;
a housing accommodating the speaker module therein, the housing forming:
a first space provided in a first direction from the speaker module, and
a second space provided in a second direction opposite to the first direction; and
an air adsorption member comprising an air adsorption material disposed in the first space,
wherein the air adsorption member comprises a powder and granulated mixture.

2. The electronic device of claim 1, wherein the air adsorption member is at least partially solidified.

3. The electronic device of claim 1, wherein the first space is sealed and at least partially includes air.

4. The electronic device of claim 1, wherein the housing includes:
a first housing disposed above the diaphragm; and
a second housing disposed under the speaker module.

5. The electronic device of claim 4, wherein the air adsorption member is fixed to a protrusion protruding from the second housing.

6. The electronic device of claim 4, wherein the air adsorption member is combined with a shock absorbing member comprising a shock absorbing material disposed on at least one of an inner side of the first housing or an inner side of the second housing.

7. The electronic device of claim 4, wherein the air adsorption member is adhered to an adhesive tape disposed on at least one of an inner side of the first housing or an inner side of the second housing.

8. The electronic device of claim 4, wherein the air adsorption member is fixed between a pair of ribs provided on the second housing.

9. The electronic device of claim 1, wherein the air adsorption member comprises an air adsorption material applied to a sheet, and
wherein the air adsorption material has a molecular structure including particles and binders configured to perform positive and negative adsorptions of air.

10. The electronic device of claim 1, wherein the air adsorption member is at least partially solidified, an outer side of the air adsorption member is combined with the housing forming the first space, and an inner side of the air adsorption member is filled with the powder and granulated mixture.

11. The electronic device of claim 1, wherein the air adsorption member is at least partially solidified and provided at a position of the housing adjacent to the speaker module, and defining a partition wall in the first space.

12. The electronic device of claim 11, wherein the first space separated by the partition wall is filled at least in part with the powder and granulated mixture.

13. The electronic device of claim 11, wherein the housing includes a ventilation mesh provided to an upper portion thereof, and
wherein the ventilation mesh comprises at least a portion of the air adsorption member.

14. The electronic device of claim 1, wherein the electronic device further comprises a passive radiator or a duct provided at a predetermined position of the first space.

15. An electronic device comprising:
a speaker module comprising a speaker configured to output a sound through a vibration of a diaphragm of the speaker;
a housing accommodating the speaker module therein, the housing including a first housing disposed at an upper position of the housing and a second housing disposed at a lower position of the housing, the housing further forming:
a first space provided in a first direction from the speaker module, and
a second space provided in a second direction opposite to the first direction; and
an air adsorption member comprising an air adsorbing material disposed in at least a part of the first housing and/or the second housing or disposed between the first and the second housing, the air adsorption member configured to adsorb air in the first space and/or the second space,
wherein the air adsorption member comprises a power and granulated mixture.

16. The electronic device of claim 15, wherein an outer surface of the air adsorption member includes a coating.

17. The electronic device of claim 15, wherein an outer surface of the air adsorption member is configured to reduce compressing and relaxing the air and to reduce leakage of the sound to an outside of the first space.

18. The electronic device of claim 15, wherein the first space is sealed and at least partially contains air.

19. The electronic device of claim 15, wherein the second space is provided between the diaphragm and a sound output port, and
wherein the air adsorption member is disposed at a predetermined position of the second space.

20. The electronic device of claim 15, wherein at least a part of the first housing disposed over the diaphragm includes the air adsorption member and is configured to reduce eccentric vibration of the diaphragm.

* * * * *